United States Patent Office 2,985,628
Patented May 23, 1961

2,985,628

HIGH MELTING COPOLYAMIDES FROM OMEGA-AMINOCARBOXYLIC ACIDS, 1,4 - CYCLOHEXANEDICARBOXYLIC ACID AND 1,4-CYCLOHEXANEBIS(METHYLAMINE)

John R. Caldwell and Russell Gilkey, Kingsport, Tenn., assignors to Eastman Kodak Company, Rochester, N.Y., a corporation of New Jersey No Drawing. Filed Jan. 24, 1957, Ser. No. 635,959

11 Claims. (Cl. 260—78)

This invention relates to improved linear highly polymeric fiber-forming copolyamides formed by the condensation of from 1 to 3 isomers of an aliphatic bifunc-omega-aminocarboxylic compound containing from 5 to 12 carbon atoms (e.g. 6-aminocaproic acid or the corresponding lactam, namely, epsilon-caprolactam) which is co-condensed with trans-1,4-cyclohexanedicarboxylic acid and a bifunctional diamine selected from the group consisting of para-xylene-α,α'-diamine, meta-xylene-α,α'-diamine, 1,4 - cyclohexanebis(methylamine) which includes the cis or the trans isomers or mixtures thereof, and hexamethylenediamine. The preferred copolyamides of this invention contain from 50 to about 85 mole percent of the omega-aminocarboxylic compound. This invention provides an up-grading of the polyamides of the class formed from an omega-aminocarboxylic compound. Of this class of polymers 6-nylon also called Perlon L is now commercially available; it softens at about 195°–200° C. and melts at about 205° to 215° C. As a result of the up-grading of such polyamide according to this invention, novel copolyamides are formed which have melting points of from about 220° C. up to about 300° C. and can be formed into clear films and molded objects, can be extruded to form excellent fibers, and are generally useful for any of the purposes for which 6-nylon or Nylon 66 is known to be useful.

In contrast to 6-nylon or Nylon 66, these novel copolyamides have improved dyeability, broader softening temperature range, higher tensile modulus, and other improved physical and chemical characteristics.

In this specification omega-aminocarboxylic acids and corresponding lactams are generically referred to as omega-aminocarboxylic compounds. The employment of a 6-aminocaproic compound in the formation of polyamides such as Perlon L or 6-nylon on a commercial scale has been only partially successful since there are many instances where a higher melting point is desirable. For general textile use, it is important to have a melting point that is about 240° C. or higher and a softening temperature of at least about 220° C. Nylon 66 has a softening temperature around 220° C. and a melting point of about 265° C.

The prior art discloses various copolyamides formed from various components including 6-aminocaproic acid or its lactam which have been characterized by even lower melting points and softening temperatures, since they are obviously not of commercial promise for general textile use. For example, a copolyamide from 6-aminocaproic acid, adipic acid, and hexamethylenediamine has been prepared and found to have melting points well below those of 6-nylon. Thus, the presence of 30–40% of adipic acid and hexamethylenediamine in this copolyamide depressed the melting point to about 170° C. A similar result was obtained with a copolymer of 6-aminocaproic acid plus hexamethylenediamine and terephthalic acid. For example, the presence of 20–30% of the terephthalic acid-hexamethylenediamine component also depressed the melting point to about 170° C. These results are in accordance with the widely accepted rule developed by Flory which states that interpolymers melt lower than the pure homopolymer, that is, if component A was added during the formation of polymer B, the melting point of polymer B would be depressed according to the molecular proportion of A. This rule is discussed at considerable length by Flory in J. Am. Chem. Soc. 72, 2024 (1950). See also J. Chem. Phys. 17, 223 (1949). The theoretical derivation is given for this rule along with considerable experimental verification. This melting point rule has been widely accepted in the field of polymer science and it is often called "Flory's Melting Point Law." The general validity of this rule has been established for polyesters, polyamides and vinyl polymers. The polyamides of this invention represent an unexpected exception to Flory's rule and thereby add an important contribution to the art which also has considerable economic value because the polyamides of 6-aminocaproic compounds and related compounds can be up-graded and their utility thereby greatly increased.

Various modifiers of polycaproamide polymers (mole percent), along with the melting point of the resulting copolyamide, are given below in order to illustrate a few examples of this invention in tabular form:

| Modifier | Melting Point of Copolyamide, ° C. |
|---|---|
| (a) None | about 210. |
| (b) 20% trans-1,4-Cyclohexanedicarboxylic acid with trans-1,4-Cyclohexanebis (methylamine). | 252–275. |
| (c) 25% as in (b) | 261–290. |
| (d) 20% trans-1,4-Cyclohexanedicarboxylic acid with p-Xylene-α,α'-diamine. | 265–283. |
| (e) 33% trans-1,4-Cyclohexanedicarboxylic acid with m-Xylene-α,α'-diamine. | 225–239. |
| (f) 20% trans-1,4-Cyclohexanedicarboxylic acid with 1,6-Hexanediamine. | 220–233. |
| (g) 40% Adipic acid with 1,4-Cyclohexanebis(methylamine). | 250. |
| (h) 30–40% Adipic acid with 1,6-hexanediamine | about 170. |
| (i) 20–30% Terephthalic acid with 1,6-hexanediamine | about 170. |

In this specification the name 1,4-cyclohexane bis-(methylamine) is the name preferred by Chemical Abstracts Nomenclature. This compound can also be called 1,4-di(aminomethyl)cyclohexane.

The copolyamides using modifiers b, c, d and g are of particular value because of their unusually high melting points. These copolyamides are exceptionally worthwhile in fabrics. Fibers made from the copolyamide using the modifier b had the following properties: tenacity of more than 4 g. per den.; 25% elongation; sticking temperature above 200° C.; excellent elastic recovery and tensile modulus. The class of polyamides using the compound which is modifier g is covered in the copending application Serial No. 617,931 dated October 24, 1956, filed by Bell, Kibler and Smith. Modifiers h and i illustrate what would have been expected of all of these modifiers in view of the prior art. Inventions related to this application are also set forth in our concurrently filed applications Serial Nos. 635,957 and 635,958.

It is an object of this invention to provide a linear highly polymeric fiber-forming copolyamide derived for the most part from the condensation of an omega-aminocarboxylic compound with an up-grading component whereby the copolyamides have higher melting points than the homopolyamides derived from the omega-aminocarboxylic compound.

An additional object of this invention is to provide a process for preparing copolyamides of an omega-aminocarboxylic compound wherein the process for preparing a homopolyamide is modified by incorporating a substantial proportion of an up-grading dicarboxy compound and an up-grading diamine.

A particularly valuable object of this invention pertains to the up-grading of those polyamides derived from branched chain omega-aminocarboxylic compounds.

A further object of this invention is to provide fibers, films, molded objects, compositions, and other materials of improved utility.

Additional objects will become apparent hereinafter.

According to a principal embodiment of this invention we have found that the class of linear highly polymeric fiber-forming polymers formed by the condensation of an aliphatic bifunctional omega-aminocarboxylic compound containing from 5 to 12 carbon atoms, can be greatly improved by having incorporated into this class of polymers from about 15 to 20 up to about 35 to 50 mole percent of polyamide components derived from trans-1,4-cyclohexanedicarboxylic acid and a bifunctional diamine selected from the group consisting of p-xylene-α,α'-diamine, m-xylene-α,α'-diamine, trans-1,4-cyclohexanebis(methylamine), cis - 1,4 - cyclohexanebis(methylamine) and hexamethylenediamine.

These up-graded polyamides can be advantageously produced by a process which comprises condensing 6-aminocaproic acid or the lactam thereof or the indicated homologs thereof containing from 5 to 12 carbon atoms, with trans-1,4-cyclohexanedicarboxylic acid and an equimolecular proportion of a bifunctional diamine selected from the group just described. Alternatively, a salt can be formed from the trans-1,4-cyclohexanedicarboxylic acid and one of the bifunctional diamines just described and this salt heated with 6-aminocaproic acid or its lactam or homolog thereof so as to form the copolyamide in accordance with this invention. Other processes can also be employed.

The techniques which can be employed for the preparation of such copolyamides are known in the art and need no detailed elaboration in this specification. Some of the techniques which can be employed are illustrated in the various examples which are set forth hereinbelow.

Valuable copolyamides can be produced in accordance with this invention which give clear films and molded objects, have melting points of 220° C. or higher, have excellent dyeability, soften over a broad range of temperatures as wide as from 10° to 20°, and possess essentially all of the valuable characteristics otherwise possessed by homopolyamides formed from 6-aminocaproic acid, its lactam or homologs thereof; thus, fibers made from the upgraded polymers of this invention have excellent physical properties such as tensile strength, elongation, elasticity, etc.

One of the most noticeable improvements which the 6-aminocaproic copolyamides of this invention have in contrast to the homopolyamides of 6-aminocaproic acid or its lactam is based upon the fact that the homopolyamide has a strong tendency to crystallize and become opaque when molded or pressed into sheets, whereas the upgraded copolyamides possess the opposite tendency toward giving clear films and molded objects.

It is most unobvious that the products of this invention have such excellent physical and chemical characteristics in contrast to those of the homopolyamide. The copolyamides wherein the bifunctional amine is p-xylene-α,α'-diamine or trans-1,4-cyclohexanebis(methylamine) are polymers of exceptional value and can be considered in a class by themselves having melting points in the range of about 250° C. or higher.

An advantageous method for preparing the copolyamides of this invention includes heating the reactants at a temperature of from about 200° to about 300° C. for several hours. Advantageously, the first stage of the heating cycle can be carried out under pressure in order to avoid the escape of volatile reactants. Thus, the first stage is preferably carried out in a closed vessel such as an autoclave. The final stage of the polymerization can be advantageously performed at atmospheric pressure in an inert atmosphere or under a vacuum. Although the processes for preparing the copolyamides of this invention can be conducted employing the free acid, it is frequently advantageous to employ the lactam. In accordance with a preferred embodiment of this invention, a salt is first prepared from equimolecular quantities of one of the designated bifunctional diamines and trans-1,4-cyclohexanedicarboxylic acid. This salt is then advantageously heated with the acid or lactam in the desired ratio.

In general, any omega-amino acid that contains from 5 to 10 carbon atoms between the carboxyl group and amino group can be used. The carbon chain can be straight or branched. Examples of straight chain amino acids are given by the general structure $$H_2N(CH_2)_nCOOH$$

where $n=5-10$. The branched chain acids can contain methyl or ethyl groups as substituents on the main carbon chain. The methyl- and ethyl-substituted 6-aminocaproic acids are of particular importance because they are derived from low-cost cresols, xylenols, and ethylphenol fractions that are obtained in coal tar and coal hydrogenation products. Heretofore, the amino acids made from the alkylated phenols were of no value because the side chains lowered the melting point of the polyamides excessively.

An important object of this invention is to provide a method for up-grading the polyamides made from branched chain amino acids to give valuable products that melt in the range required for textile fibers and high-melting plastics. Although amino acids containing methyl or ethyl groups are of value in the process of the invention, higher alkyl groups such as propyl, isobutyl, and butyl can be present. Suitable examples of branched chain amino acids include: 6-aminocaproic acid having a methyl or ethyl group in the 2, 3, 4, or 5 position; 7-aminoheptanoic acid having a methyl or ethyl group on any carbon except the seventh; higher amino acids are represented by 4-ethyl-10-aminodecanoic acid, 6-methyl-11-aminoundecanoic acid, etc.; if two substituents are present, it is preferred but not essential that they be located on the same carbon atom in order to give a symmetrical structure as represented by 3,3-dimethyl-6-aminocaproic acid and 4,4-dimethyl-7-aminoheptanoic acid. The omega carbon atom preferably contains no additional alkyl substituent.

Although it is preferred to use only one amino acid in the copolyamides of the present invention, in some cases a mixture of two or three amino acids can be employed. For example, satisfactory results can be obtained by using the mixture of methyl-substituted 6-aminocaproic acids made from commercial "cresylic acid" which is a mixture of o-, m-, and p-cresol. The principal components are 3- and 4-methyl-6-aminocaproic acids.

This invention can be further illustrated by the following examples of preferred embodiments although it will be understood that these examples are included merely for purposes of illustration and are not intended to limit the scope of the invention unless otherwise specifically indicated.

*Example 1*

A mixture consisting of 90.4 grams (0.8 mole) of epsiloncaprolactam, 34.4 grams (0.2 mole) of trans-1,4-cyclohexanedicarboxylic acid, and 28.4 grams (0.2 mole) of trans-1,4-cyclohexanebis(methylamine) was placed in a stainless steel autoclave. The latter two reactants were added in the form of a 40% water solution of their salt. The autoclave was purged with nitrogen and then further purged of air by heating to 120° C. and releasing a small amount of water vapor. The release valve was closed and the autoclave was heated to 260° C. while maintaining a pressure of about 60 p.s.i. The pressure was then slowly bled to atmospheric and heating at 260-270° C. was continued for two hours. The resulting colorless copolyamide was extruded from the reactor by nitrogen pressure. The inherent viscosity of the polymer, as measured in 60 phenol-40 tetrachloroethane, was 0.87. The microcrystalline melting point, as measured under crossed nicols on the hot stage of a microscope, was 252-275° C. This polymer was moderately crystalline and was melt spun into fibers which were cold drawn and heat set. The fibers dyed readily with disperse dyes. The polymer was also valuable as a molding material. The relatively wide melting point range increased the ease of processing in extrusion. Clear, transparent molded articles were obtained due to the slower rate of crystallization of the copolyamide.

Example 2

A copolyamide was made, according to the process described in Example 1, starting with the same monomers but containing 75 mole percent polycaproamide instead of 80 mole percent in the product. The product had a higher melting range, 261-290° C., but otherwise had properties very similar to those of the product in Example 1. It was useful in the manufacture of film and fiber by melt extrusion. The fibers possess all the desirable characteristics of polycaproamide (6-nylon) in addition to a higher sticking temperature. They also dye more readily and have higher tensile moduli and are well suited as fibers for use in tire cords.

The copolyamides of Examples 1 and 2 having 65 mole percent of the polycaprolactam melt in the vicinity of 300° C. Either the cis or trans-isomers or mixtures thereof can be employed. It is generally most practical to use a 50/50 mixture of these isomers; the copolyamide produced melts at a lower temperature with increased proportions of the cis-isomer but generally well above 240° C.

Example 3

The following materials were placed in a 100-ml. flask fitted with an exit tube and an inlet tube to the bottom of the flask through which nitrogen could be passed: 9.04 grams (0.08 mole) of epsilon-caprolactam, 6.16 grams (0.02 mole) of the salt of trans-1,4-cyclohexanedicarboxylic acid and p-xylene-$\alpha,\alpha'$-diamine, and 2 ml. of water. The contents of the flask were melted at 190° C. while maintaining an atmosphere of nitrogen. As water distilled from the reaction mixture, the temperature was gradually raised to 280° C. to keep it melted. Heating at 280° C. was continued for one hour while bubbling nitrogen through the melt. A colorless, viscous melt of the copolyamide was obtained. This polymer had an inherent viscosity of 0.73 in 60 phenol-40 tetrachloroethane and a microcrystalline melting point of 265-283° C. This copolyamide can be used in the production of fibers, films, sheets, and molded articles having excellent properties as described hereinabove. Copolyamides having about 70 mole percent of the polycaprolactam melt in the vicinity of 290° C.

Example 4

The m-xylene-$\alpha,\alpha'$-diamine salt of trans-1,4-cyclohexanedicarboxylic acid was used to modify polycaproamide by the method described in Example 3. The copolyamide contained 67 mole percent polycaproamide. It had an inherent viscosity of 0.73 in 60 phenol-40 tetrachloroethane and a microcrystalline melting point of 225°-239° C. It was particularly valuable as a molding plastic. Clear, transparent objects can be made by compression or extrusion molding which remain clear on long standing or on heating. Copolyamides containing as much as 80 mole percent of polycaproamide had similar properties and melted in the vicinity of 225° C.

Example 5

The following materials were placed in a 100-ml. flask: 4.52 grams (0.04 mole) of epsilon-caprolactam, 1.72 grams (0.01 mole) of trans-1,4-cyclohexanedicarboxylic acid, and a 75% water solution containing 1.16 grams (0.01) of hexamethylenediamine. The flask was flushed with nitrogen and an atmosphere of nitrogen was maintained in the flask during the course of the reaction. The contents of the flask were heated at 150° C. until the excess water was removed. Heating was continued at 200° C. for 30 minutes and finally at 240° C. for two hours. A colorless polymer was obtained. It had an inherent viscosity of 0.71 and a microcrystalline melting point of 220-233° C. This copolyamide is soluble in a variety of solvents such as formic acid, acetic acid, butyrolactone, dimethylformamide, etc. Clear, flexible films were cast from dopes. The polymer was valuable as a molding plastic. Copolyamides containing 65 mole percent of polycaproamide had similar properties and melted at above 230° C.

The copolyamides of Examples 4 and 5 are especially characterized by being essentially equivalent in most respects to 6-nylon and having improved dyeability of film or fibers, having improved ease of processing in forming molded and extruded shapes, and having improved clarity or transparency in the shaped object or film.

Example 6

The polyamide made from 7-aminoheptanoic acid melts at 225° C. which is somewhat low for the manufacture of textile fibers. According to the process of the invention, as more particularly described in the above examples, copolyamides having substantially higher melting points were obtained, as shown below:

(a) A copolyamide was made from 0.75 mole of 7-aminoheptanoic acid, 0.25 mole of trans-1,4-cyclohexanedicarboxylic acid, and 0.25 mole of 1,4-cyclohexanebismethylamine which melted at 255-270° C.

(b) A copolyamide was made from 0.65 mole of 7-aminoheptanoic acid, 0.35 mole of trans-1,4-cyclohexanedicarboxylic acid, and 0.35 mole of p-xylene-$\alpha$-$\alpha'$-diamine which melted at 260-280° C.

(c) A copolyamide was made from 0.60 mole of 7-aminoheptanoic acid, 0.40 mole of trans-1,4-cyclohexanedicarboxylic acid, and 0.40 mole of hexamethylenediamine which melted at 260-280° C.

Example 7

The polyamide made from 11-aminoundecanoic acid melts at 186° C. Employing the process of this invention as described above the following copolyamides were produced:

(a) A copolyamide was made from 0.60 mole of 11-aminoundecanoic acid, 0.40 mole of trans-1,4-cyclohexanedicarboxylic acid, and 0.4 mole of 1,4-cyclohexanebismethylamine which melted at 230-245° C. This product is particularly useful as a molding plastic.

(b) A copolyamide was made from 0.6 mole of 11-aminoundecanoic acid, 0.4 mole of trans-1,4-cyclohexanedicarboxylic acid, and 0.4 mole of hexamethylenediamine which melted at 225-240° C.

Example 8

A mixture of methyl-substituted 6-aminocaproic acids was obtained from commercial "cresylic acid" by known methods. The mixture contained principally 3-, and 4-methyl-6-aminocaproic acids. The polyamide made from the mixture softened in the range of 160-180° C. and was completely melted at about 185° C. By following the process of this invention as described hereinbefore the following copolyamides were produced.

(a) A copolyamide was made from 0.55 mole of the mixed 3-, and 4-methyl-6-aminocaproic acids, 0.45 mole of trans-1,4-cyclohexanedicarboxylic acid, and 0.45 mole p-xylene-$\alpha,\alpha'$-diamine which melted at 235-255° C.

(b) A copolyamide was made from 0.55 mole of the mixed acids, 0.45 mole of trans-1,4-cyclohexanedicarboxylic acid, and 0.45 mole of hexamethylenediamine which melted at 225–240° C.

*Example 9*

The polyamide made from 4,4-dimethyl-7-aminoheptanoic acid is difficult to crystallize and melts in the range of 135–155° C. A copolyamide was made from 0.6 mole of 4,4-dimethyl-7-aminoheptanoic acid, 0.4 mole of trans-1,4-cyclohexanedicarboxylic acid, and 0.4 mole of 1,4-cyclohexanebismethylamine which melted at 215–230° C. and was crystallized without difficulty.

*Example 10*

The polyamide from 4-methyl-6-aminocaproic acid melts in the range of 170–185° C. A copolyamide was made from 0.60 mole of 4-methyl-6-aminocaproic, 0.40 mole trans-1,4-cyclohexanedicarboxylic acid, and 0.40 mole p-xylene-α,α′-diamine which melted at 230–245° C.

All of the copolyamides described above can be made into fibers and films which can be oriented and heat set to form valuable materials for general textile use and many other purposes such as wrapping materials, electrical insulation, etc. Moreover, useful molding and extrusion plastics are also provided by this invention and are superior to those obtained from 6-nylon and Nylon 66 in several important respects especially at elevated temperatures and during processing operations where a broad softening range is desirable. The production of crystal clear products of advantageously high melting points is especially noteworthy. Transparent films can be produced which can be readily dyed.

Although the invention has been described in considerable detail with reference to certain embodiments thereof, it will be understood that variations and modifications can be effected without departing from the spirit and scope of the invention as described hereinabove and as defined in the appended claims.

We claim:

1. A linear highly polymeric copolyamide having a melting point of from about 220° to 300° C. of from 85 to 50 mole proportions of an aliphatic bifunctional omega-aminocarboxylic acid containing from 5 to 12 carbon atoms, from 15 to 50 mole proportions of trans-1,4-cyclohexanedicarboxylic acid and a corresponding number of mole proportions substantially equal to the mole proportions of trans-1,4-cyclohexanedicarboxylic acid of a bifunctional diamine selected from the group consisting of trans-1,4-cyclohexane-bis(methylamine) and cis-1,4-cyclohexanebis(methylamine).

2. A copolyamide as defined by claim 1 of from 85 to 50 mole proportions of 6-aminocaproic acid, from 15 to 50 mole proportions of trans-1,4-cyclohexanedicarboxylic acid and an equimolecular proportion of 1,4-cyclohexanebis(methylamine).

3. A copolyamide as defined by claim 2 of about 4 mole proportions of 6-aminohexanoic acid, 1 mole proportion of trans-1,4-cyclohexanedicarboxylic acid and 1 mole proportion of trans-1,4-cyclohexanebis(methylamine), characterized by melting at about 252°–275° C.

4. A copolyamide as defined by claim 2 of about 2 to about 4 mole proportions of 6-aminohexanoic acid, 1 mole proportion of trans-1,4-cyclohexanedicarboxylic acid and 1 mole proportion of mixed cis and trans isomers of 1,4-cyclohexanebis(methylamine) characterized by melting at about 240°–300° C.

5. A process for preparing a linear highly polymeric copolyamide comprising heating from about 15 to about 50 mole proportions of trans-1,4-cyclohexanedicarboxylic acid, from about 85 to 50 mole proportions of an omega-aminocarboxylic compound containing from 5 to 12 carbon atoms selected from the group consisting of lactams and aminoacids and from about 15 to about 50 mole proportions of a bifunctional diamine selected from the group consisting of trans-1,4-cyclohexanebis(methylamine) and cis-1,4-cyclohexanebis(methylamine) whereby there is formed a copolyamide melting at above 220° C.

6. A film of a copolyamide as defined in claim 1.
7. A fiber of a copolyamide as defined in claim 1.
8. A film of a copolyamide as defined in claim 2.
9. A fiber of a copolyamide as defined in claim 2.
10. A film of a copolyamide as defined in claim 4.
11. A fiber of a copolyamide as defined in claim 4.

References Cited in the file of this patent

UNITED STATES PATENTS

| | | |
|---|---|---|
| 2,130,523 | Carothers | Sept. 30, 1938 |
| 2,241,321 | Schlack | May 6, 1941 |
| 2,252,555 | Carothers | Aug. 12, 1941 |
| 2,625,536 | Kirby | Jan. 13, 1953 |

FOREIGN PATENTS

| | | |
|---|---|---|
| 873,983 | France | Apr. 13, 1942 |
| 1,112,203 | France | Nov. 9, 1955 |

OTHER REFERENCES

Hill et al.: J. Polymer Scie., vol. 3, 1948, pp. 609, 619–621.

Edgar et al.: J. Polymer Sci., vol. 8, 1952, pp. 1, 4, 5, 16, 17.

Evans et al.: J. Amer. Chem. Soc., vol. 72, 1950, pp. 2018–2028.